US012302087B2

(12) United States Patent
Lee et al.

(10) Patent No.: US 12,302,087 B2
(45) **Date of Patent: *May 13, 2025**

(54) SYSTEMS AND METHODS FOR MODIFYING ROOM CHARACTERISTICS FOR SPATIAL AUDIO RENDERING OVER HEADPHONES

(71) Applicant: Creative Technology Ltd, Singapore (SG)

(72) Inventors: Teck Chee Lee, Singapore (SG); Christopher Hummersone, Surrey (GB); Mark Anthony Davies, Middlesex (GB); Toh Onn Desmond Hii, Singapore (SG)

(73) Assignee: Creative Technology Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,877

(22) Filed: Nov. 14, 2022

(65) Prior Publication Data

US 2023/0072391 A1 Mar. 9, 2023

Related U.S. Application Data

(63) Continuation of application No. 16/653,130, filed on Oct. 15, 2019, now Pat. No. 11,503,423.

(Continued)

(51) Int. Cl.

*H04S 7/00* (2006.01)
*H04S 1/00* (2006.01)
*H04S 3/00* (2006.01)

(52) U.S. Cl.

CPC .............. *H04S 7/304* (2013.01); *H04S 3/008* (2013.01); *H04S 7/306* (2013.01); *H04S 2400/01* (2013.01); *H04S 2420/01* (2013.01)

(58) Field of Classification Search

CPC . H04S 7/304; H04S 7/303; H04S 7/00; H04S 7/306; H04S 7/30; H04S 3/008;

(Continued)

(56) References Cited

U.S. PATENT DOCUMENTS 5,748,758 A 5/1998 Menasco, Jr.
7,840,019 B2 11/2010 Slaney et al.

(Continued)

FOREIGN PATENT DOCUMENTS

CN 105792090 7/2016
CN 107835483 3/2018

(Continued)

OTHER PUBLICATIONS

Japanese Patent Office, Japanese Office Action dated Apr. 12, 2021 in Application No. 2019-194536.

(Continued)

*Primary Examiner* — Leshui Zhang

(74) *Attorney, Agent, or Firm* — SNELL & WILMER L.L.P.

(57) ABSTRACT

An audio rendering system includes a processor that combines audio input signals with personalized spatial audio transfer functions having room responses. The personalized spatial audio transfer functions are selected from a database having a plurality of candidate transfer functions derived from in-ear microphone measurements for a plurality of individuals. Alternatively, the personalized transfer functions are derived from actual in-ear measurements of the listener. A room modification module allows the user to modify the personalized spatial audio transfer functions to substitute a different room or to modify the characteristics of the selected room without requiring additional in ear measurements. The module segments the selected transfer function into regions including one or more of direct; head and (Continued)

torso influenced; early reflection, and late reverberation regions. Extraction and modification operations are performed on one or more of the regions to alter the perceived sound.

10 Claims, 5 Drawing Sheets

Related U.S. Application Data

(60) Provisional application No. 62/750,719, filed on Oct. 25, 2018.

(58) Field of Classification Search
CPC ........ H04S 3/00; H04S 3/004; H04S 2400/01; H04S 2400/11; H04S 2420/01; H04S 1/005; H04S 1/00; H04R 5/04; G10L 19/008; G10L 19/00
USPC ..... 381/300–307, 309, 310, 311, 26, 72, 74, 381/73.1, 86, 89, 332, 98–103, 111–115, 381/118, 119, 122, 61, 63, 95, 96, 94.4, 381/66, 92; 700/94
See application file for complete search history.

(56) References Cited

U.S. PATENT DOCUMENTS

| | | | | |
|---|---|---|---|---|
| 7,936,887 | B2 | 5/2011 | Smyth | |
| 9,030,545 | B2 | 5/2015 | Pedersen | |
| 9,544,706 | B1 | 1/2017 | Hirst | |
| 9,584,946 | B1 * | 2/2017 | Lyren | H04W 88/02 |
| 9,591,427 | B1 * | 3/2017 | Lyren | G06F 3/013 |
| 10,225,682 | B1 | 3/2019 | Lee et al. | |
| 2003/0007648 | A1 | 1/2003 | Currell | |
| 2006/0045294 | A1 | 3/2006 | Smyth | |
| 2007/0270988 | A1 | 11/2007 | Goldstein | |
| 2008/0273708 | A1 * | 11/2008 | Sandgren | H04S 1/005 381/63 |
| 2011/0268281 | A1 | 11/2011 | Florencio et al. | |
| 2012/0183161 | A1 | 7/2012 | Agevik et al. | |
| 2015/0073262 | A1 | 3/2015 | Roth et al. | |
| 2015/0223002 | A1 | 8/2015 | Mehta | |
| 2015/0312694 | A1 * | 10/2015 | Bilinski | H04S 7/301 381/1 |
| 2015/0373477 | A1 | 12/2015 | Norris et al. | |
| 2016/0337779 | A1 | 11/2016 | Davidson et al. | |
| 2016/0379041 | A1 | 12/2016 | Rhee et al. | |
| 2017/0223478 | A1 | 8/2017 | Jot et al. | |
| 2017/0272890 | A1 | 9/2017 | Oh et al. | |
| 2018/0077514 | A1 | 3/2018 | Lee et al. | |
| 2018/0091920 | A1 | 3/2018 | Family | |
| 2018/0206059 | A1 | 7/2018 | Fueg et al. | |
| 2018/0218507 | A1 | 8/2018 | Hyllus et al. | |
| 2018/0249279 | A1 | 8/2018 | Karapetyan et al. | |
| 2020/0322727 | A1 * | 10/2020 | Smyth | H04S 5/00 |

FOREIGN PATENT DOCUMENTS

| | | | |
|---|---|---|---|
| FR | 3051951 | 6/2018 | |
| JP | 2008512015 | 4/2008 | |
| WO | 2006024850 | 3/2006 | |
| WO | 2015102920 | 7/2015 | |
| WO | 2017041922 | 3/2017 | |
| WO | 2017116308 | 7/2017 | |
| WO | 2017202634 | 11/2017 | |
| WO | 2017203011 | 11/2017 | |
| WO | WO-2017203011 A1 * | 11/2017 | H04R 29/001 |

OTHER PUBLICATIONS

Japanese Patent Office, Japanese Search Report dated Dec. 23, 2020 in Application No. 2019-194536.

CNIPA, First Chinese Office Action dated Jan. 20, 2023 in Application No. 201911024774.7.

Meshram et al., "P-HRTF: Efficient Personalized HRTF Computation for High-Fidelity Spatial Sound," 2014 IEEE ntemational Symposium on Mixed and Augmented Reality (ISMAR), 2014, pp. 53-61, Munich, Germany.

Dalena, Marco. "Selection of Head-Related Transfer Function through Ear Contour Matching for Personalized Binaural Rendering," Politecnico Di Milano Master thesis for Master of Science in Computer Engineering, 2013, Milano, Italy.

Cootes et al., "Active Shape Models—Their Training and Application," Computer Vision and Image Understanding, Jan. 1995, pp. 38-59, vol. 61, No. 1, Manchester, England.

John C. Middlebrooks, "Virtual localization improved by scaling nonindividualized external-ear transfer functions in frequency," Journal of the Acoustical Society of America, Sep. 1999, pp. 1493-1510, vol. 106, No. 3, Pt. 1, USA.

Yukio Iwaya, "Individualization of head-related transfer functions with tournament-style listening test: Listening with other's ears," Acoustical Science and Technology, 2006, vol. 27, Issue 6, Japan.

Slim Ghorbal, Theo Auclair, Catherine Soladie, & Renaud Segui ER, "Pinna Morphological Parameters influencing HRTF Sets," Proceedings of the 20th International Conference on Digital Audio Effects (DAFx-17), Sep. 5-9, 2017, Edinburgh, UK.

Slim Ghorbal, Renaud Seguier, & Xavier Bonjour, "Process of HRTF individualization by 30 statistical ear model," Audio Engineering Society's 141st Convention e-Brief 283, Sep. 29, 2016-Oct. 2, 2016, Los Angeles, CA.

Robert P. Tame, Daniele Barchiesi, & Anssi Klapuri, "Headphone Virtualisation: Improved Localisation and Extemalisation of Non-individualised HRTFs by Cluster Analysis," Audio Engineering Society's 133rd Convention Paper, Oct. 26-29, 2012, San Francisco, CA.

Zotkin, Dmitry et al., HRTF Personalization Using Anthropometric Measurements, 2003 IEEE Workshop on Applications of Signal Processing to Audio and Acouistics, Oct. 19-22, 2003, p. 157-160, New Paltz, NY.

AES Society, "Elevation Control in Binaural Rendering", 140th Convention, Jun. 4-7, 2016, Paris, France, p. 1-4 (Year: 2016).

USPTO, Non-Final Office Action dated Nov. 27, 2019 in U.S. Appl. No. 16/653,130.

USPTO, Final Office Action dated Mar. 10, 2020 in U.S. Appl. No. 16/653,130.

USPTO, Non-Final Office Action dated Sep. 29, 2020 in U.S. Appl. No. 16/653,130.

USPTO, Final Office Action dated May 25, 2021 in U.S. Appl. No. 16/653,130.

USPTO, Non-Final Office Action dated Jan. 5, 2022 in U.S. Appl. No. 16/653,130.

USPTO, Notice of Allowance dated Jul. 19, 2022 in U.S. Appl. No. 16/653,130.

Korean Intellectual Propoerty Office, Korean Written Opinion dated Nov. 3, 2022 in Application No. 10-2019-01133368.

Japanese Intellectual Propoerty Office, Japanese Written Opinion dated Jul. 9, 2021 in Application No. 2019-194536.

Japanese Intellectual Propoerty Office, Japanese Written Opinion dated Jan. 25, 2022 in Application No. 2019-194536.

TIPO, Taiwan Office Action and Search Report dated Jul. 25, 2023 in Application No. 108137662.

EPO; European Summons to Attend Oral Proceedings dated Nov. 21, 2023 in European Application No. 19204434.

TIPO, Taiwan Office Action dated Sep. 6, 2023 in Application No. 108137662.

EPO; Summons to Attend Oral Proceedings dated Apr. 11, 2024 in European Application No. 19204434.

EPO; Extended European Search Report dated Feb. 27, 2020 in Application No. 192044345.

CNIPA; Chinese Search Report dated Jan. 20, 2023 in Application No. 201911024774.

* cited by examiner

SYSTEMS AND METHODS FOR MODIFYING ROOM CHARACTERISTICS FOR SPATIAL AUDIO RENDERING OVER HEADPHONES

CROSS REFERENCES TO RELATED APPLICATIONS

This application is a continuation of and claims the benefit of priority from U.S. Non Provisional patent application Ser. No. 16/653,130 filed 15 Oct. 2019, and titled "SYSTEMS AND METHODS FOR MODIFYING ROOM CHARACTERISTICS FOR SPATIAL AUDIO RENDERING OVER HEADPHONES", which claims the benefit of priority from and incorporates by reference U.S. Provisional Patent Application: 62/750,719, filed 25 Oct. 2018, and titled, "SYSTEMS AND METHODS FOR MODIFYING ROOM CHARACTERISTICS FOR SPATIAL AUDIO RENDERING OVER HEADPHONES", which incorporates by reference U.S. Provisional Patent Application: 62/614,482, filed 7 Jan. 2018, and titled, "METHOD FOR GENERATING CUSTOMIZED SPATIAL AUDIO WITH HEAD TRACKING", the entirety of each of which are incorporated by reference for all purposes. This application also incorporates by reference U.S. Pat. No. 10,390,171, filed on 19 Sep. 2018; issued on 20 Aug. 2019 and titled. "METHOD FOR GENERATING CUSTOMIZED SPATIAL AUDIO WITH HEAD TRACKING", the entirety of which is incorporated by reference for all purposes.

BACKGROUND OF THE INVENTION

1. Field of the Invention

The present invention relates to methods and systems for rendering audio over headphones. More particularly, the present invention relates to using databases of personalized spatial audio transfer functions having room impulse response information for generating more realistic audio rendering.

2. Description of the Related Art

The practice of Binaural Room Impulse Response (BRIR) processing is well known. According to known methods, a real or dummy head and binaural microphones are used to record a stereo impulse response (IR) for each of a number of loudspeaker positions in a real room. That is, a pair of impulse responses, one for each car, is generated. A music track may then be convolved (filtered) using these IRs and the results mixed together and played over headphones. If the correct equalization is applied, the channels of the music will then sound as if they were being played in the speaker positions in the room where the IRs were recorded.

The BRIR and its related Binaural Room Transfer Function (BRTF) simulate the interaction of sound waves from a loudspeaker with the listener cars, head and torso, as well with the walls and other objects in the room. Room size affects sound as do the sound reflection and absorption qualities of the walls in the room. Loudspeakers are typically encased in an enclosure the design and composition of which affect the quality of the sound. When the BRTF is applied to an input audio signal and fed into separate channels of headphones, natural sounds are reproduced with directional and spatial impression cues that simulate the sound that would be heard from a real source in the same position as the loudspeaker in a real room as well as with the sound quality attributes of the loudspeaker.

The actual BRIR measurements are typically made by seating an individual in a room and measuring with in-car microphones the impulse responses from a loudspeaker. The measurement process is extremely time consuming requiring the patient cooperation of the listener as a large number of measurements are taken for the different loudspeaker positions relative to the head location of the listener. These typically are taken for at least every 3 or 6 degrees in azimuth in the horizontal plane around the listener but can be fewer or greater in number and also can encompass elevation locations relative of the listener as well as measurements relating to different head tilts. Once all of these measurements are completed, a BRIR dataset for that individual is generated and made available to apply to audio signals typically in the corresponding frequency domain form (BRTF) to provide the aforementioned directional and spatial impression cues.

In many applications the typical BRIR dataset is inadequate for the listener's needs. Typically, BRIR measurements are made with the loudspeaker at about 1.5 m from the listener's head. But often the listener might prefer to perceive the loudspeaker to be positioned at a greater or lesser distance. For example, in music playback, a listener might prefer that stereo signals appear to be positioned at 3 or more meters from the listener. In video gaming situations an audio object might be positionable with the proper directionality using the BRTFs but the distance of the object inaccurately represented by the distance associated with the single BRTF dataset available. At best, even with attenuation applied to the signal to convey the sense of an increased distance from the measured listener head to loudspeaker distance, the perception of distance is indefinite. It would be useful to have available BRIRs customized for the different listener head to speaker distances. Further still, due to measurement constraints the loudspeaker used in the BRIR measurement process may have been limited in size and/or quality whereas the listener would have preferred that the BRIR dataset had been recorded using a higher quality loudspeaker. While these situations can be handled in some cases by remeasuring the individual under the changed circumstances, that would be a costly, time-consuming approach. It would be desirable if selected portions of the BRIR for the individual could be modified to represent changed loudspeaker-room-listener distances or other attributes without resorting to remeasurement of the BRIR.

SUMMARY OF THE INVENTION

To achieve the foregoing, the present invention provides in various embodiments a processor configured to provide binaural signals to headphones to include room impulse responses to provide realism to the audio tracks. Modifications to BRIRs are provided by applying one or more techniques to one or more segmented regions of BRIRs. As a result, one or more of the loudspeaker-room-listener characteristics are modified without requiring a remeasurement of an individual.

DETAILED DESCRIPTION OF PREFERRED EMBODIMENTS

Figure 1:
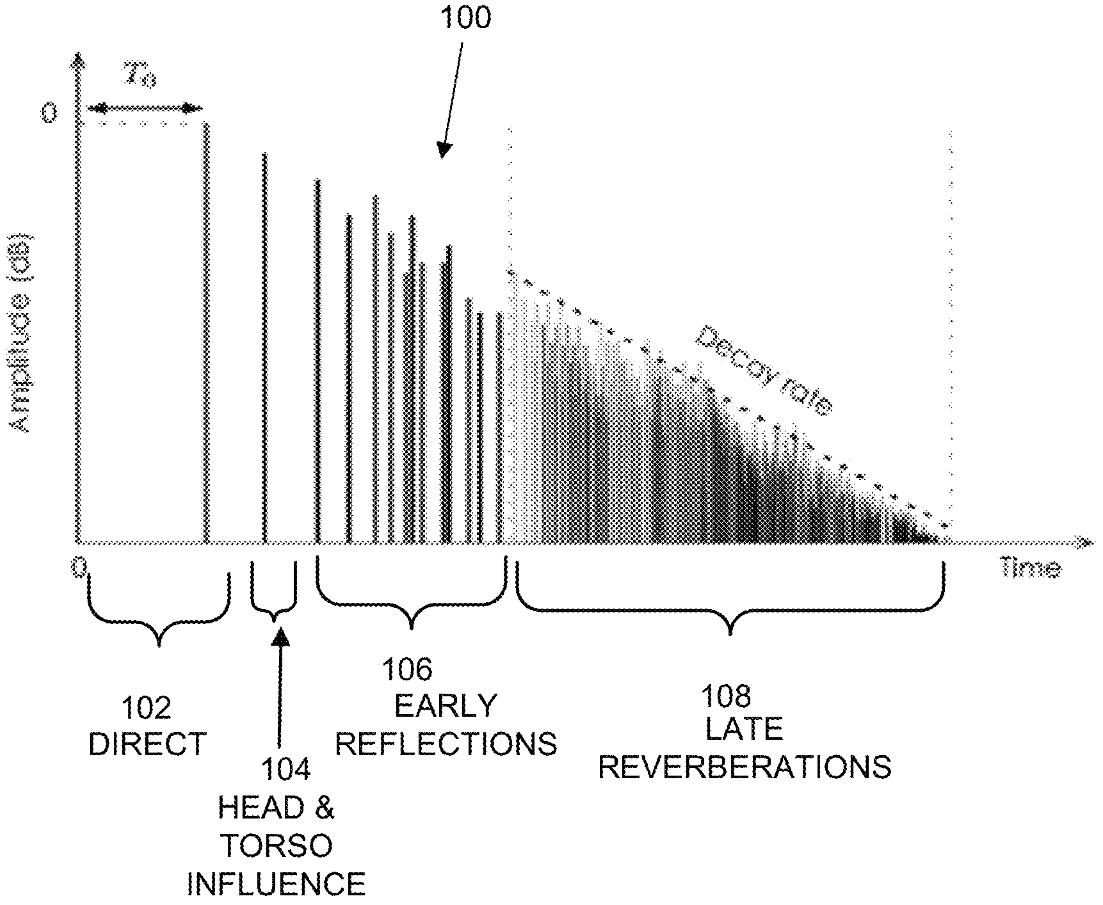
FIG. 1 is a diagram illustrating graphically the different regions of the BRIRs subject to processing in accordance with one embodiment of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

A room has many characteristics which have substantial effects on the audio reproduction, i.e., what is heard by the listener. These include, among others, wall texture, wall composition, sound absorption, and the presence of objects. Moreover, the relationship between the room and speakers and the dimensions and configurations of the room and other environmental characteristics also affect the sound heard in a room or other environment by the listener. Accordingly, if a room changes or room/speaker characteristics change, these changed characteristics will have to be replicated in the spatial audio perceived by the listener through headphones. One method would comprise remeasuring the listener for a new BRIR dataset under the changed conditions, i.e., in the new room. But if one wished to provide to the listener the perception of being in the new room with specified changed characteristics, and such a "new" room was not available, even the time consuming BRIR dataset in-car measurement techniques would not be available. Given the limitations presented by taking in-car BRIR measurements for providing individualized BRIR datasets, alternate and efficient methods are provided to shorten the process by simulating the modifications that would occur if the measurements were taken in a resized room, a room where one or more room characteristics have been modified, or for an entirely different room (room swapping). Modifying any of several different portions (regions) of the determined BRIRs presents to the listener a different spatial audio experience.

To achieve the foregoing, the present invention provides in various embodiments a processor configured to provide binaural signals to headphones to include room impulse responses to provide realism to the audio tracks. Modifying the BRIRs to allow the listener to perceive the audio in a different way to mimic changed room/speaker characteristic changes requires generally: (1) segmenting the BRIR into regions; (2) performing a digital signal processing (DSP) operation (techniques) on selected one or more of the regions; and (3) recombining the regions after modification, including in some embodiments BRIRs or BRIR regions culled from other rooms/loudspeakers. Care must be taken when recombining to ensure smooth transitions between the regions of the BRIR after modification to avoid creation of unwanted sound artifacts.

Spatial audio positioning changes are generated by applying one or more processing techniques to one or more segmented regions of BRIRs. The combination of techniques selected are a function of the desired room characteristics to be modified. As a result, one or more of the BRIR regions relating to the interplay between loudspeaker-room-listener characteristics are modified without requiring a remeasurement of an individual.

FIG. 1 is a diagram illustrating graphically the different regions (time segments) of the BRIRs subjected to processing in accordance with some embodiments of the present invention. The BRIR 100 is shown graphically in FIG. 1 with 4 different regions illustrated. The direct region 102, head and torso influenced region 104, and early reflections region 106 precede the late reverberations region 108. The listener receives first the direct path signal after time $T_0$. At this point in time, no reflections have reached the listener's cars. Next, the listener perceives signals influenced by the listener's head and torso, depicted generally at the location identified as the head and torso influenced region 104. Next, a series of early reflections are received during an initial period of the reverberation response in the early reflections region 106. Finally, late reverberations are received at the ears of the listener, depicted by the late reverberations region 108. The magnitudes of the delays from the initial direct-path signal and the arrival of the early and late reverberations are typically dependent on the size of the room and on the position of the source and the listener in the room. Reverberation can be characterized by measurable criteria, one of which is the RT60. This is an abbreviation for Reverberation Time-60 dB. RT60 provides an objective reverberation time measurement. It is defined as the time it takes for the sound pressure level to reduce by 60 dB, which is a measure of the time it takes for the reverberation to become effectively imperceptible. Typically, the late reverberations region 108 will commence at about 50 ms after initiation of the impulse response, but this figure can vary from room to room depending on the room characteristics.

In preferred embodiments, identifying the time for start and end of this region (and the other isolated regions) are performed in conjunction with segmentation operations designed to identify and modify only those portions of the BRIR necessary for modification of the parameter or parameters selected.

Figure 2:
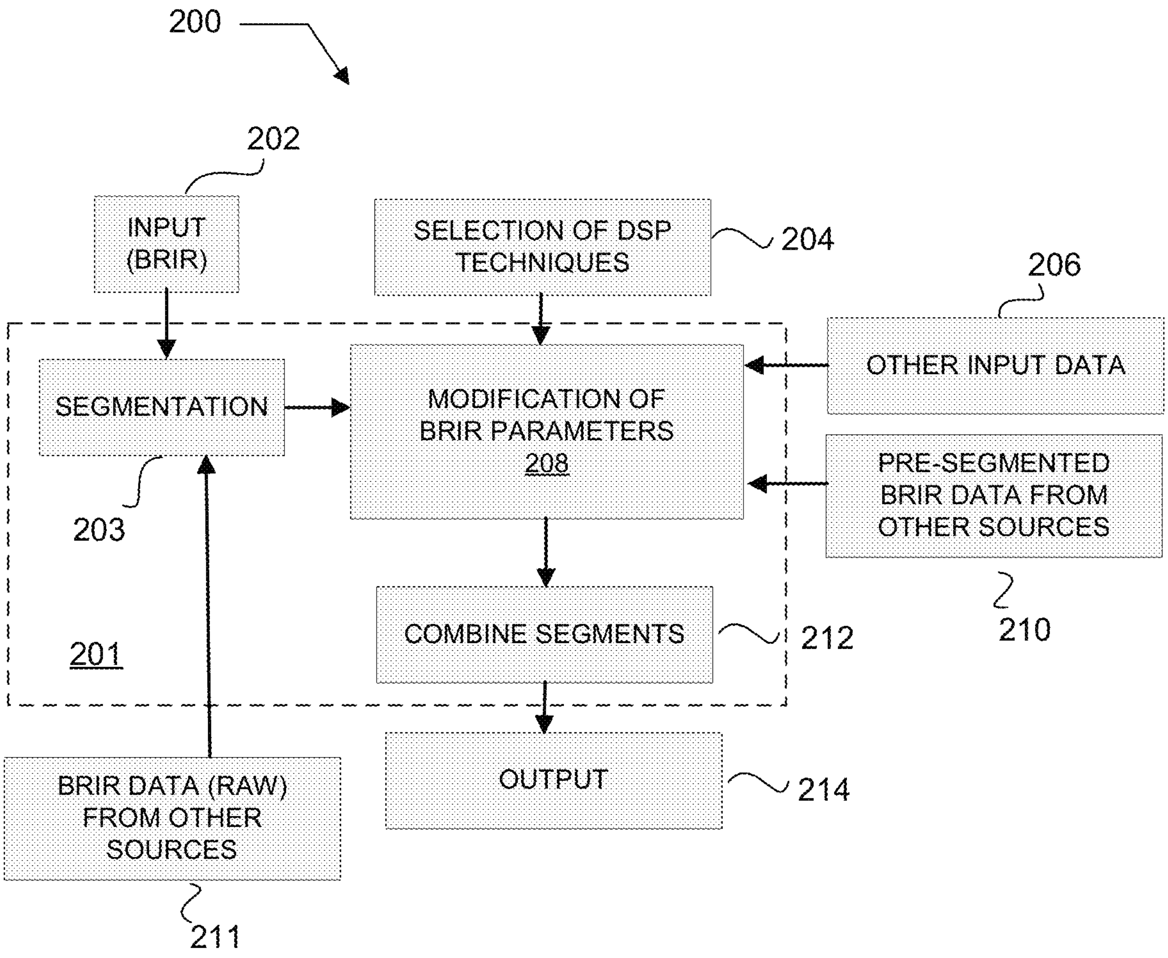
FIG. 2 is a block diagram illustrating modules for the modification of BRIRs without requiring additional in ear measurements in accordance with embodiments of the present invention.

FIG. 2 is a block diagram illustrating modules for the modification of BRIRs in accordance with room characteristic changes and without requiring additional in-ear measurements in accordance with embodiments of the present invention. For each desired BRIR region modification selected, the system 200 further involves a combination of operations including selection of the BRIR segments, selection of appropriate DSP techniques, and combining BRIR data from other sources as appropriate. Examples of BRIR region modifications that can be performed in block 208 of the processor 201 in accordance with some embodiments of the invention are summarized below. A non-limiting sampling of the room and loudspeaker dimensions to room objects and other sound affecting characteristics that can be changed by directly modifying BRIR regions includes changing the loudspeaker, changing the loudspeaker position in relation to the room walls, and changing the loudspeaker distance in relation to the listener. Additionally, without limiting the scope of the invention, changes to the RT60 reverberation time, the room size/dimensions; the room construction features, and the room furnishings (by addition or subtraction) and positions may be mimicked by the BRIR region modifications in accordance with some embodiments of the present invention.

Some embodiments of the invention cover the combination of any suitable DSP techniques with any of the segments derived from the customized BRIR for the individual, together with modified parameters for BRIRs that may be available in a library or collection of already modified BRIR parameters from another BRIR database. For example, a BRIR may have been generated for a high-quality loudspeaker and stored, in this case likely having a higher frequency range content in at least the direct region 102. Regions of that BRIR may be isolated for combining with regions of the customized (individualized) BRIR for the individual at hand.

These modification techniques may be necessarily performed in some cases on only one of the 4 identified regions of the impulse response (see FIG. 1) and in other cases on 2 or more of the regions. In cases where the DSP techniques are applied to at least one of the plurality of the 4 distinct regions of the impulse response, segmentation of the received input BRIR 202 occurs in block 203. Segmentation into distinct regions of the impulse response may be performed by any suitable method. For example, time estimates may be made for the start time of the late reverberations region at 50 ms and the impulse response isolated to that region at 50 ms and beyond. The 50 ms value is only an approximate/typical time for the start of the reverb. The actual value will depend on the dimensions of the room and other physical factors. Other techniques for identifying and isolating the Impulse Response regions include echo density estimation or measures of interaural coherence.

Additional input data are generally required for selection of the BRIR parameters to be modified as well as the actual modification. For example, if it is desired to change the loudspeaker from that used in the original BRIR determinations, the BRIR data from other sources in block 210 involve loudspeaker impulse response measurements for the "new" loudspeaker. In one sample embodiment, the processor 201 is involved in both analyzing the BRIR or HRIR to estimate the onset and offset of direct sound in the BRIR to replace the direct portion with the impulse response of the different loudspeaker, preferably obtained previously. In some embodiment Processor 201 is involved in synthesizing the resulting BRIR by extracting (deconvolving) the measured loudspeaker response from the direct portion of the BRIR/HRIR in block 203 and in combining by convolution the deconvolved result with the impulse response of the target loudspeaker.

Alternatively, additional or other input data are provided to the processor 201 via block 206. According to one or more embodiments, it may be desired to change the distance between the listener (subject) and the loudspeaker. Input data 206 required for such a change include the distance for the original BRIR and the distance for the synthesized BRIR. Additionally, BRIR data are provided via block 210; here the BRIR database of impulse responses measured at 1 or more different distances (the plural databases needed when interpolation is desired). In this implementation, at least the direct region, the early reflections region, and the late reverberation regions are involved. In this implementation, the processor 201 performs a segmentation operation by first identifying the 3 regions involved. The processor preferably estimates a late reverb time, for example by echo density estimation or other suitable techniques. The early reflection time is also estimated. Finally, the onset and offset of the direct sound (see the direct region 102) is performed. Further, the processor module 208 in processor 201 synthesizes the new BRIR by applying attenuation to the direct sound based on the relative distance between the original and the synthesized BRIRs. Further, the early reflections are modified by one of several techniques. For example, the original BRIR may be time stretched or interpolated between two different BRIRs. Filtering or the use of ray tracing, including in one non-limiting embodiment, simplified ray tracing, may alternatively be used to determine the timings of the reflections. Ray tracing generally involves determining possible paths for every new ray emitted from the sound source; considering the ray to be a vector that changes its direction upon every reflection, it is energy decreasing as a consequence of the sound absorption of the air and of the walls involved in the propagation path.

In other preferred implementations, the interplay between the loudspeaker and the room characteristics are modified. These are discussed in more detail below in the sections describing music, movies, and gaming applications. But generally, these include: (1) loudspeaker position; (2) room size, dimensions, and shape, (3) room furnishings; and (4) room construction. Input data for the changed loudspeaker position include the original loudspeaker position, the new loudspeaker position, and the room dimensions. The processor 201 via processing blocks 203 and 208 performs a room geometry estimation. This is an area of signal processing that attempts to identify the position and absorption of room boundaries from an impulse response. It could be used in some embodiments to identify acoustically significant objects. In some other embodiments the room geometry is already known and its audio characteristics can be computed from ray tracing or other means. Room geometry estimation may still be performed to guide the computation, or it may be skipped if there is sufficient data.

The processor 201 is further involved in synthesizing new BRIRs by modifying the early reflections region according to proximity to the walls and validating the energy at the old and new positions by using the inverse square law. Speaker rotation can be changed by changing the azimuth and elevation angles with interpolation available for fine tuning the results. The speaker distance to the listener can be modified by referencing the BRIR dataset to find one corresponding to the new distance. Distance primarily affects the attenuation of the direct portion of the sound. However, the early reflections will also change. Changing the distance inevitably means changing the position of the speaker, which will also change the distance to walls and other objects. These changes will affect the early reflections part of the impulse response.

In similar fashion, for the room furnishings and room construction estimations, the processor 201 analyzes the impulse response by performing a room geometry estimation as discussed above. In these cases, the additional input data needs to include the target furnishing (for room furnishing implementations) and the target room construction (for room construction modifications).

It should be noted that the system illustrated in FIG. 2 may be used with any BRIRs without limitation. That is, the BRIR parameter modification techniques of the present invention such as illustrated by the system of FIG. 2 may be applied to all types of BRIRs, no matter how they are obtained. For example, they will work on any of: (1) customized in-car measured (BRIRs) for an individual; (2) semi-custom BRIRs derived by extracting image based properties and/or other measurements for an individual and determining suitable BRIRs from a candidate database of BRIRs with correlated properties, for a further nonlimiting example, as determined by using Artificial Intelligence methods (AI) or other image-based property matching methods; and (3) commercially available datasets of BRIRs such as including those based on in-car microphones positioned in the cars of mannequins or "average" individuals for a population or based on other research results.

Figure 3:
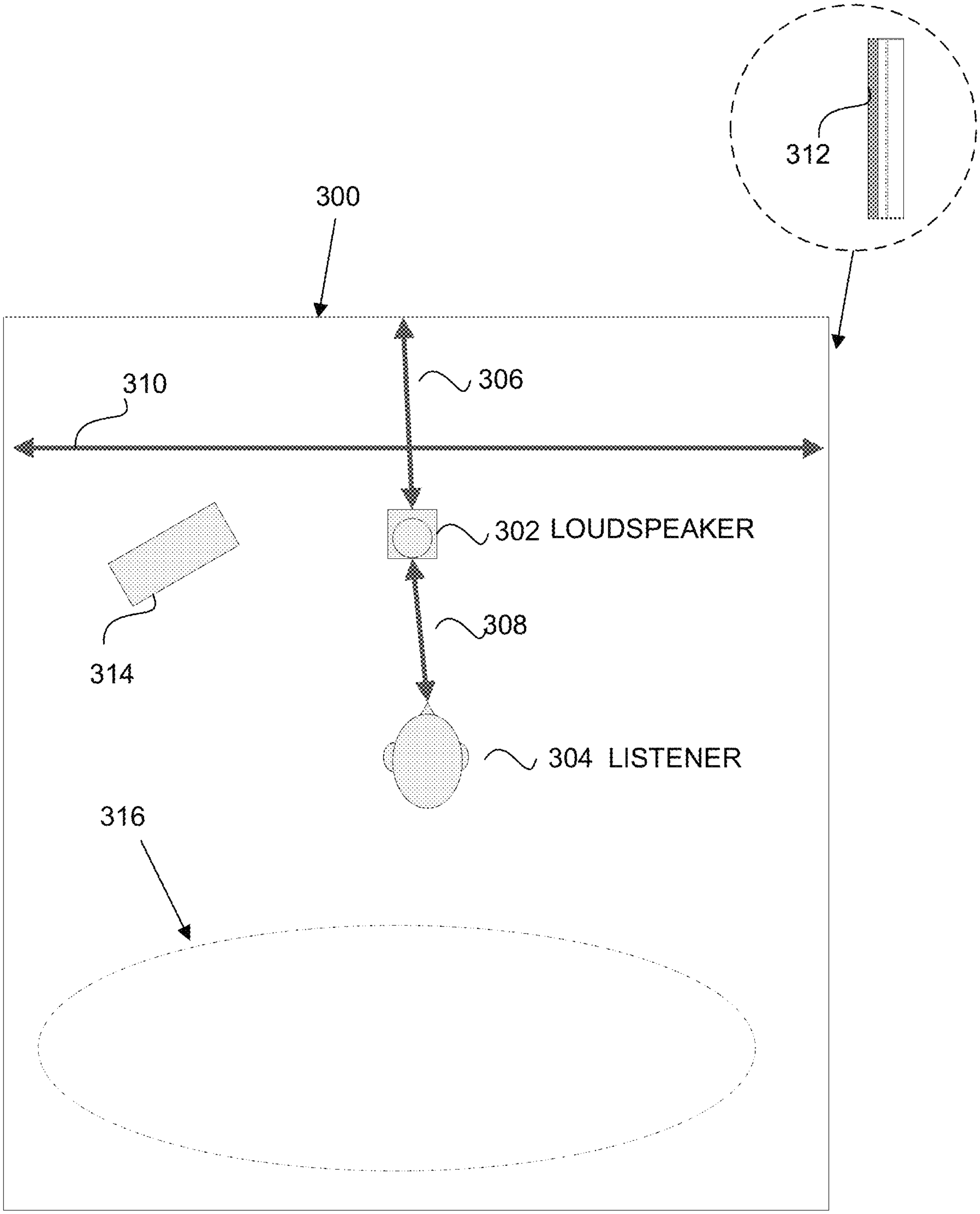
FIG. 3 is a diagram of a room illustrating speaker and room characteristics that can be targeted for modification in BRIRs by processing one or more regions of the BRIRs in accordance with some embodiments of the present invention.

FIG. 3 is a diagram of a room illustrating speaker and room characteristics that can be targeted for modification in BRIRs by processing one or more regions of the BRIRs in accordance with some embodiments of the present invention. The room 300 is shown with loudspeaker 302 positioned at a distance 308 from listener 304. The room dimensions such as room width 310 have significant influence on the room audio as does the loudspeaker placement, such as represented by distance 306 for the loudspeaker from the room wall. The room wall construction 312, such as the materials used in the wall construction has major effects on the room acoustics. For example, reflections off of hard walls, floor, and ceiling will affect the room acoustics differently from those surfaces made of more absorptive materials such as gypsum drywall. The addition or subtraction of room furnishing 314 and their locations likewise affect room acoustics. As noted above, RT60 (denoted by reference number 316) provides an objective reverberation time measurement. This metric is an important measure of the suitability of a room for different genres of music, for optimizing a room for cinema playback, and for gaming.

In order to synthesize or modify one or more regions of BRIRs to identify improved or optimized changes an understanding of the application in mind for the methods and systems of the present invention. Three prominent applications include: (1) music, (2) cinema and (3) gaming/virtual reality.

For music applications, the room/speaker characteristics having the greatest impact on the listening experience include the selection of the loudspeaker; the loudspeaker position in relation to the room walls; the room RT60; and the room size, dimensions, and shape. Of these, changing the loudspeaker will have the greatest impact. Music aficionados may have preferences for different speakers to be matched to the playback of certain music genres. The real-world room would require a room full of alternatively selectable speakers and switching networks. Instead, and according to some embodiments of the present invention this can be readily achieved by modifying the loudspeaker relevant regions of the BRIR for the individual. This is done by first estimating the onset and offset of the direct sound in the HRIR in order to replace the impulse response with one that would be generated by the substitute speaker. Once the direct region for the captured loudspeaker is obtained, the measured loudspeaker impulse response is deconvolved from the direct region of the HRIR. According to one embodiment the original loudspeaker is deconvolved from the direct region of the BRIR. In another embodiment the original loudspeaker is deconvolved from the entire BRIR. In the first example embodiment, the operation is reversed by convolving the new loudspeaker with the direct region of the response. In the second embodiment, the reverse operation is performed by convolving the new loudspeaker with the entire response. While full deconvolution is the more accurate method, the deconvolution of only the direct region is submitted as providing satisfactory results as the influence of the loudspeaker on the room reflections is probably small. In other embodiments, we replace the direct region with the corresponding direct region from other BRIRs.

From a high level, the most prominent effects of the measured loudspeaker are removed for the individualized impulse response and those prominent regions from the target loudspeaker are substituted in to the individual's measured impulse response.

It is common that loudspeakers sound different when moved to a new room. This occurs due to the early reflections and late reverberation effects of the room. In order to substitute in the new loudspeaker's characteristics, the target loudspeaker impulse response is not a room response. That is, the target loudspeaker is preferably measured under anechoic conditions, thereby providing through input data module 210 impulse response data to the processor 201. Alternatively, the target loudspeaker direct region may be extracted from a stored or otherwise available BRIR and input. In the latter case the complete BRIR, such as provided via input 211, would be need to be segmented to generate the direct region from the complete BRIR.

As noted earlier, the RT60 room parameter is a metric for evaluating the room reverberation decay characteristics and useful in the music context. Certain music genres are felt to be best appreciated when matched to rooms having matched RT60 values. For example, jazz music is felt to be best appreciated in rooms having an RT60 value around 400 ms. In order to perceive a change to the new RT60 value, i.e., the new target reverb time, in some embodiments an estimate of the energy decay curve of the impulse is made using reverse integration. Then linear regression techniques are applied to estimate the slope of the decay curve and hence the reverberation time. To match the targeted value an amplitude envelope is applied in the time domain or the warped frequency domain.

Further still, changes may be made to the loudspeaker position. These changes require input information, such as provided through block 206, as to the original loudspeaker location, the new loudspeaker location, and the room dimensions. The analysis stage performed in processor 201 includes a room geometry estimation in some embodiments. Room geometry estimation is an area of signal processing that aims to identify the position and absorption of room boundaries from an impulse response. It could also be used to identify acoustically-significant objects. In music settings, one generally prefers not to place loudspeakers too close to a wall to avoid a dominating bass presence. In some embodiments, speaker rotation is implemented by the processor 201 by changing azimuth and/or elevation angles. In further detail filtering is applied to rotate the azimuth and elevation angles and interpolation applied to fine tune the results. Speaker distance can be modified by applying the same techniques applicable when modifying the listener to loudspeaker distance. More particularly, in some embodiments we apply attenuation to the direct sound based on the relative distance between the distance setting for the original and synthesized BRIRs. We then modify the early reflections according to the proximity to walls. Several different techniques could be applied here. For example, in some embodiments, choices are made between interpolating between two different BRIRs, time stretching the original BRIR, filtering, or using ray-tracing to determine the timings of reflections. In one embodiment, simplified ray tracing is used. The input data could include a BRIR database of impulse responses measured at different distances for interpolation purposes.

Other room characteristics that can be targeted in the music realm for BRIR modifications include the room size, dimensions, and shape. These can be most easily modified by focusing on the early reflections region and the late reverberations region. In analyzing the BRIR, in one embodiment we estimate the first reflection in order to remove reverberation. The inputs required could include the target room dimensions, or alternatively the Room impulse response (provided through input 211 for segmenting or presegmented through input 210). In synthesizing the new reverberation for the new room chosen we can generate reverberation for the BRIR late reverberation region via several methods including but not limited to: (1) a feedback delay network; (2) a combination of all-pass filters, delay lines, and a noise generator; (3) ray tracing, or (4) actual BRIR measurements. We then can filter the room reverberation according to some embodiments according to the Head Related Impulse Response (HRIR). Since room reflections will be modified by the HRTF/HRIR of the subject, analogous processing of the reverberation needs to be performed to adapt the reverberation for the new subject. This could be applied with a time-varying filter or via STFT.

The methods and systems identified in embodiments of the present invention can be suitably applied to movie applications. Movie theatres/cinemas have sound systems generally configured to maximize the spatial quality given the constraints imposed by the audio format and the widely-distributed seating arrangements. One way for delivering evenly balanced sound is to use multiple speakers distributed across multiple locations in movie theatres. For this application, the most useful room/loudspeaker characteristics for modification focus includes: (1) loudspeaker to listener distance; (2) loudspeaker position; (3) room RT60; (4) room size, dimensions, and shapes; and (5) room furnishings. The specific Digital Signal Processing steps involved in analysis and synthesis for modifying the first four characteristics have been described above in the music application and will only be described here in summary form. Modifying the room furnishings will have a significant effect on movie theatre (such as including home theatres). The input data 206 include the target furnishings. A room geometry estimate is performed to identify the position and related absorption of room boundaries from an impulse response and to also identify acoustically significant objects. Since room reflections in the room with changed absorption/reflectivity (due to the changes in furnishings) will necessitate modification by the HRTF of the listener, an analogous processing takes place for the reverberation region to adapt the new furnishing-based reverberation to the listener. This is preferably applied with a time varying filter or via STFT.

Though not specifically significant for theatre applications, the room construction can also be changed. These would be inclusive of but not limited to any materials used for walls/cladding, any additional sound absorption, ceiling materials and structure. Specific methods for analyzing the room construction are analogous to those applicable to changing room furnishings. That is, a room geometry estimate is first performed to identify the position and absorption of room boundaries from an impulse response. Once the target room construction is input, a room reverberation is generated based on the room geometry estimation. The synthesized room reverberation is then filtered in the STFT (frequency) domain to adapt the reverberation to the listener's HRTF. This could be applied with a time varying filter or via STFT. Room construction modifications are useful to modify the acoustic environment for gaming and Virtual Reality (VR) applications.

Most of the analysis and synthesis techniques discussed above are applicable to the Gaming/VR implementations. Exceptions to this general statement include swapping loudspeakers. Dynamic changes dictate the modifications since a participant may be changing rooms or the environments quickly. For example, the listener may be moving form a cave to a forest to space. It is important to model the environment, one which is often synthesized in 3D design space. Ray tracing is an especially important technique for identifying the properties of the room or environment. In summary, the most important modifications to the room/loudspeakers in the Gaming/VR realm include: (1) the loudspeaker distance to listener; (2) the room RT60; (3) room size, dimensions, and shape; (4) room furnishings; (5) non interior room environments; (6) fluid property variation; (7) body size of listener; and (8) acoustic morphing. The first 4 analysis synthesis techniques have been described above in relation to the music and movie applications.

In order to generate non-room environments, in some embodiments the existing BRIR is segmented to identify and remove the late reverberation and early reflections regions. This can be done by estimating the first reflection. Information on the target environment is input and a corresponding reverberation generated by ray tracing. The synthesized reverberation is then joined to the original BRIR. These techniques can be important for outdoor or in general any non-interior room environments. The techniques described above are also applicable to vary fluid properties. These properties can include temperature, humidity, and density. The properties can be changed by time and/or pitch shifting/stretching. Of course, the steps undertaken will be dictated by the information retrieved regarding the target environment.

The Gaming/VR applications might require changes to a body size and generate acoustic changes as well. To accurately synthesize the new environment over headphones, an estimate for the current body size is made and filtering is performed to generate the acoustics for the target body size.

Acoustic morphing creates another need for BRIR modifications in the gaming area. These arise from moving sources, dynamic room properties such as moving walls, or transitions between different acoustic spaces. In embodiments of the present invention, these are handled by accepting input information as to the source or environmental change occurring. These are applicable to any of the properties or other characteristics described above in the music, movies, or gaming applications. Accommodating these dynamic changes involves mixing together one or more of the impulse responses according to the context. In many of the BRIR modifications described above, changes are focused on one or more regions of the room response with the listener remaining. There are many instances where the individual listener needs to be removed from the room for use elsewhere or to bring in a measured (captured) HRTF for a new individual to place him in the current room. Initially, this is performed by estimating the onset and offset of the direct sound region, such as region 102 in FIG. 1. Extraction of the individual's direct region, and in another embodiment additionally the head and torso region occurs through frequency warping. In another embodiment simple truncation is used. When another subject is to be substituted into the current room, the new subject's direct region impulse response and in another embodiment the direct region and head and torso influenced regions are used to replace the corresponding region(s) of the corresponding regions of the current subject's BRIR. Since the new subject's HRTF will modify the room reflections processing of the reverberation, it is necessary to adapt it to the reverberation of the new subject. This is done in preferred embodiments by time varying filters or via an STFT.

Figure 5:
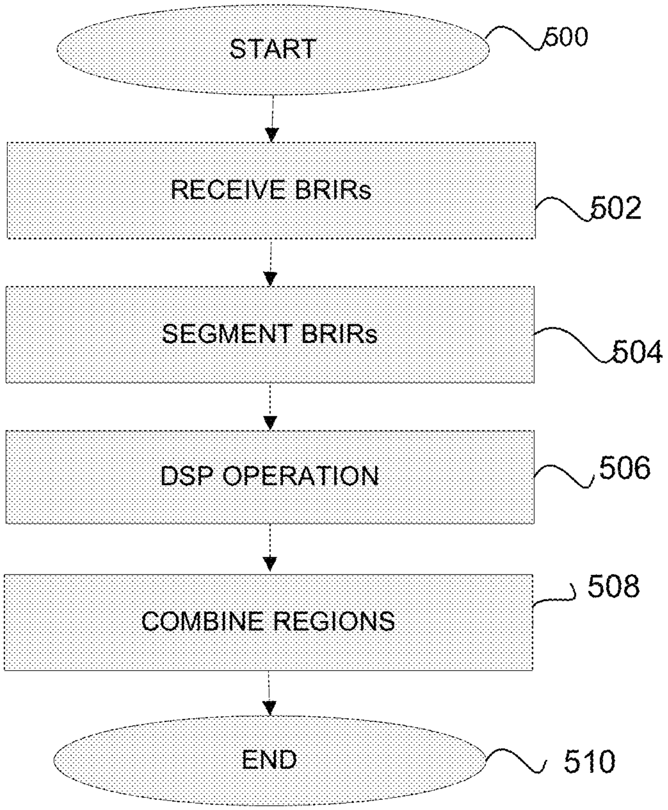
FIG. 5 is a diagram illustrating steps in modifying BRIRs to substitute a different room or to modify the characteristics of the selected room without requiring additional in-car measurements in accordance with embodiments of the present invention.

For added clarity additional examples of segmenting BRIR regions and performing DSP operations are providing below. FIG. 5 is a diagram illustrating steps in modifying the personalized spatial audio transfer functions to substitute a different room or to modify the characteristics of the selected room without requiring additional in-ear measurements in accordance with embodiments of the present invention. Initially, the process starts at step 502 wherein a BRIR or a personalized spatial audio transfer functions having both the direct HRTF functionality and the room response functionality are received. In reference to the BRIR and in accordance with embodiments of the invention the BRIR from the BRIR dataset can be associated with a single point in 3-dimensional space. More preferably, the entire set of transfer functions selected or determined for an individual are modified. These can be a plurality of BRIRs such as for 5.1 multichannel setups or can include an entire spherical grid of impulse responses to completely represent the directional space around a listener's head. Next in step 504 the BRIR is segmented into separate regions. As illustrated with respect to FIG. 1 these regions preferably will include: (1) the direct region; (2) the head and torso influenced region; (3) early reflections; and (4) late reverberations. The types of room modifications or swapping desired will determine both the region selected and the type of operation performed. For a non-limiting example the starting point for revising the room's size is in modifying the timing of the early reflections (they would arrive later in a larger room). The timing and duration of the late reverberation is a product of the room's size and absorptivity of its boundaries.

Next in step 506, a first operation is focused on a first region. The modifying operations available include but are not limited to truncation, altering the slope of the decay rate, windowing, smoothing, ramping, and full room swapping. For example, if we desired to modify the reverberations of a room we can focus on the late reverberations of the impulse response and change the decay rate. This can be done by using the same initial position for the reverberations region but shortening the end position. Preferably the energy or amplitude is measured at the original end point followed by attenuation of the reverberation signal to the newly selected end point (shorter in time), resulting in a new slope which more quickly decays to the small value known as room noise. This provides the sensation to the listener of a smaller room. In yet another embodiment, a simpler operation can include truncation. This works to provide a different sensation to the listener of a smaller room but also tends to leave an impression that signs of the original room are still present. To endure smoothness in the intermediate points interpolation is preferably performed. In one embodiment to more accurately mimic the room response in room resizing operations a second region is processed. This preferably includes the early reflections region.

These steps could also be applied for isolation of another segment of the impulse response. In the example noted above this can include focusing on the early reflections region. The early reflections ideally are separated from the late reverberations. Early reverberations are present in the early reflections region but are typically masked by the early reflections. Generally, the early reflections will decay differently than the reverberations. That is, the reverberation decay will have a gentler (lower) slope in comparison to the early reflections slope. There are a number of methods, including "echo density estimation" to separate out the early reflections. The early reflections occur in a region when the echo density is low. Once this second region is isolated, a DSP operation is performed on this isolated segment of the impulse response. This preferably would include those operations that would provide a best match to an estimate as to how, in this example, the resized room would respond in this region of the impulse response.

Although this example has been described as performing the second operation on a second (and different) region, the invention is not so limited. The scope of the invention is intended to cover multiple operations performed on the same region as well as sequentially performing operations (the same or different) on different regions.

In yet another sample embodiment frequency warping is applied for extracting an HRTF from the combined HRTF/Room Impulse Response (the BRIR). Since FFT resolution is a function of time in order to avoid loss of resolution in the low frequency regions (e.g., below 500 Hz) frequency warping is preferably performed initially. As a result, we generate a frequency response capturing all relevant frequency bins and preserve the tonality of the voice. In essence, we apply frequency warping to extract the HRTF from the BRIR.

Once the extracted HRTF is generated (by any of several different possible steps) the freshly extracted HRTF is placed in a different room in a combining step 508 by combining the extracted HRTF with a template for the Room Impulse Response for the new room. Alternatively, the extracted HRTF may be placed in the same room and the room operations described earlier in this specification are applied. The process ends at step 510.

Extracting the HRTF can provide important improvements in the clarity of video games. In such games, the room reverberation provides conflicting or blurred directional information and may overwhelm his sense of directionality from cues provided in the audio. One solution is to remove the room (reduce the room to zero) then extract the HRTF. We then use the derived HRTF to process the game, providing better directionality without the blurred directional information caused by too much reverb.

Figure 4:
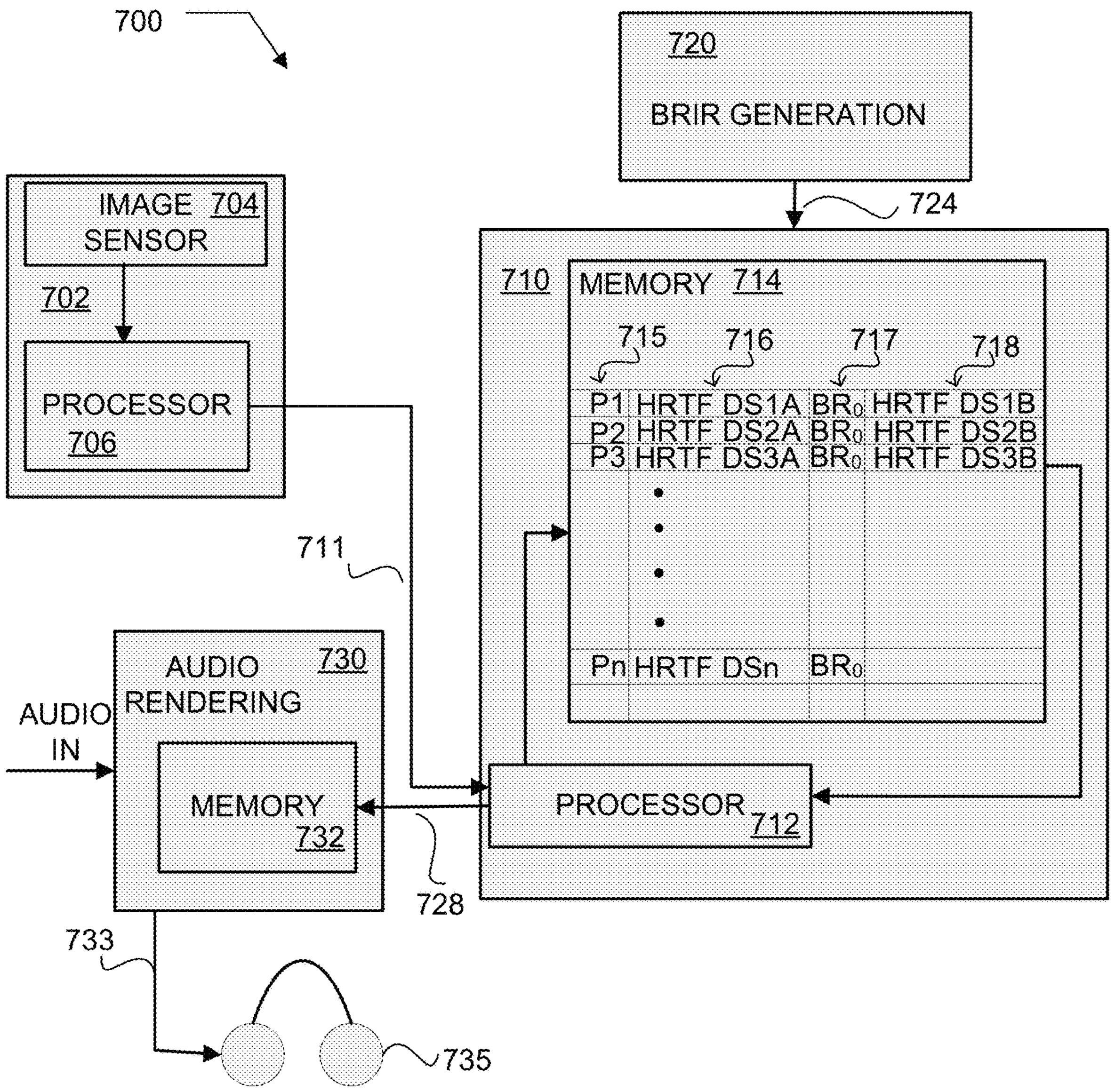
FIG. 4 is a diagram of a system for generating BRIRs for customization, acquiring listener properties for customization, selecting customized BRIRs for listeners, and for rendering audio modified by BRIRs in accordance with embodiments of the present invention.

The systems and methods for modifying BRIR regions discussed above work best when the BRIR is individualized for the listener by either direct in-car microphone measurement or alternatively individualized BRIR datasets where in-car microphone measurements are not used. In accordance with preferred embodiments of the present invention, a "semi-custom" method for generating the BRIRs is used which involves the extraction of image-based properties from a user and determining a suitable BRIR from a candidate pool of BRIRs as depicted generally by FIG. 4. In further detail, FIG. 4 illustrates a system for generating HRTFs for customization use, acquiring listener properties for customization, selecting customized HRTFs for listeners, providing rotation filters adapted to work with relative user head movement and for rendering audio as modified by BRIRs in accordance with embodiments of the present invention. Extraction Device 702 is a device configured to identify and extract audio related physical properties of the listener. Although block 702 can be configured to directly measure those properties (for example the height of the car) in preferred embodiments the pertinent measurements are extracted from images taken of the user, to include at least the user's car or cars. The processing necessary to extract those properties preferably occurs in the Extraction Device 702 but could be located elsewhere as well. For a non-limiting example, the properties could be extracted by a processor in remote server 710 after receipt of the images from image sensor 704. It should be noted that in some embodiments we make use of images of the head and upper torso, in order to extract additional features regarding the size of the head and size of the torso and other head or torso related features.

In a preferred embodiment, image sensor 704 acquires the image of the user's car and processor 706 is configured to extract the pertinent properties for the user and sends them to remote server 710. For example, in one embodiment, an Active Shape Model can be used to identify landmarks in the car pinnac image and to use those landmarks and their geometric relationships and linear distances to identify properties about the user that are relevant to selecting a BRIR from a collection of BRIR datasets, that is, from a candidate pool of BRIR datasets. In other embodiments an RGT model (Regression Tree Model) is used to extract properties. In still other embodiments, machine learning such as neural networks and other forms of artificial intelligence (AI) are used to extract properties. One example of a neural network is the Convolutional neural network. A full discussion of several methods for identifying unique physical properties of the new listener is described in WIPO Application: PCT/SG2016/050621, filed on 28 Dec. 2016 and titled, "A METHOD FOR GENERATING A CUSTOMIZED/PERSONALIZED HEAD RELATED TRANSFER FUNCTION", which disclosure is incorporated fully by reference herein.

The remote server 710 is preferably accessible over a network such as the internet. The remote server preferably includes a selection processor 710 to access memory 714 to determine the best matched BRIR dataset using the physical properties or other image related properties extracted in Extraction Device 702. The selection processor 712 preferably accesses a memory 714 having a plurality of BRIR datasets. That is, each dataset will have a BRIR pair preferably for each point at the appropriate angles in azimuth and elevation and perhaps also head tilt. For example, measurements may be taken at every 3 degrees in azimuth and elevations to generate BRIR datasets for the sampled individuals making up the candidate pool of BRIRs.

As discussed earlier, these are preferably derived by measurement with in car microphones on a population of moderate size (i.e., greater than 100 individuals) but can work with smaller groups of individuals and stored along with similar image related properties associated with each BRIR set. These can be generated in part by direct measurement and in part by interpolation to form a spherical grid of BRIR pairs. Even with the partially measured/partially interpolated grid, further points not falling on a grid line can be interpolated once the appropriate azimuth and elevation values are used to identify an appropriate BRIR pair for a point from the BRIR dataset. For example, any suitable interpolation method may be used including but not limited to the adjacent linear interpolation, bilinear interpolation, and spherical triangular interpolation, preferably in the frequency domain.

Each of the BRIR Datasets stored in memory 714 in one embodiment includes at least an entire spherical grid for a listener. In such case, any angle in azimuth (on a horizontal plane around the listener, i.e. at ear level) or elevation can be selected for placement of the sound source. In other embodiments the BRIR Dataset is more limited, in one instance limited to the BRIR pairs necessary to generate loudspeaker placements in a room conforming to a conventional stereo setup (i.e., at +30 degrees and −30 degrees relative to the straight ahead zero position or, in another subset of a complete spherical grid, speaker placements for multichannel setups without limitation such as 5.1 systems or 7.1 systems.

The HRIR is the head-related impulse response. It completely describes the propagation of sound from the source to the receiver in the time domain under anechoic conditions. Most of the information it contains relates to the physiology and anthropometry of the person being measured. HRTF is the head-related transfer function. It is identical to the HRIR, except that it is a description in the frequency domain. BRIR is the binaural room impulse response. It is identical to the HRIR, except that it is measured in a room, and hence additionally incorporates the room response for the specific configuration in which it was captured. The BRTF is a frequency-domain version of the BRIR. It should be understood that in this specification that since BRIRs are easily transposable with BRTFs and likewise, that HRIRs are easily transposable with HRTFs, that the invention embodiments are intended to cover those readily transposable steps even though they are not specifically described here. Thus, for example, when the description refers to accessing another BRIR dataset it should be understood that accessing another BRTF is covered.

FIG. 4 further depicts a sample logical relationship for the data stored in memory. The memory is shown including in column 716 BRIR Datasets for several individuals (e.g., HRTF DS1A, HRTF DS2A, etc.) These are indexed and accessed by properties associated with each BRIR Dataset, preferably image related properties. The associated properties shown in column 715 enable matching the new listener properties with the properties associated with the BRIRs measured and stored in columns 716, 717, and 718. That is, they act as an index to the candidate pools of BRIR Datasets shown in those columns. Column 717 refers to a stored BRIR at reference position zero and is associated with the remainder of the BRIR Datasets and can be combined with rotation filters for efficient storage and processing when the listener head rotation is monitored and accommodated. Further description of this option is described in detail in U.S. Provisional Application 62/614,482, filed 7 Jan. 2018, and titled, "METHOD FOR GENERATING CUSTOMIZED SPATIAL AUDIO WITH HEAD TRACKING".

In some embodiments of the present invention 2 or more distance spheres are stored. This refers to a spherical grid generated for 2 different distances from the listener. In one embodiment, one reference position BRIR is stored and associated for 2 or more different spherical grid distance spheres. In other embodiments each spherical grid will have its own reference BRIR to use with the applicable rotation filters. Selection processor 712 is used to match the properties in the memory 714 with the extracted properties received from Extraction device 702 for the new listener. Various methods are used to match the associated properties so that correct BRIR Datasets can be selected. These include comparing biometric data by Multiple-match based processing strategy; Multiple recognizer processing strategy; Cluster based processing strategy and others as described in U.S. patent application Ser. No. 15/969,767, titled, "SYSTEM AND A PROCESSING METHOD FOR CUSTOMIZING AUDIO EXPERIENCE", and filed on 2 May 2018, which disclosure is incorporated fully by reference herein. Column 718 refers to sets of BRIR Datasets for the measured individuals at a second distance. That is, this column posts BRIR datasets at a second distance recorded for the measured individuals. As a further example, the first BRIR datasets in column 716 may be taken at 1.0 m to 1.5 m whereas the BRIR datasets in column 718 may refer to those datasets measured at 5 m, from the listener. Ideally the BRIR Datasets form a full spherical grid but the present invention embodiments apply to any and all subsets of a full spherical grid including but not limited to: a subset containing BRIR pairs of a conventional stereo set; a 5.1 multichannel setup; a 7.1 multichannel setup, and all other variations and subsets of a spherical grid, including BRIR pairs at every 3 degrees or less both in azimuth and elevation as well as those spherical grids where the density is irregular. For example, this might include a spherical grid where the density of the grid points is much greater in a forward position versus those in the rear of the listener. Moreover, the arrangement of content in the columns 716 and 718 apply not only to BRIR pairs stored as derived from measurement and interpolation but also to those that are further refined by creating BRIR datasets that reflect conversion of the former to an BRIR containing rotation filters.

After selection of one or more matching BRIR Datasets, the datasets are transmitted to Audio Rendering Device 730 for storage of the entire BRIR Dataset determined by matching or other techniques as described above for the new listener, or, in some embodiments, a subset corresponding to selected spatialized audio locations. The Audio Rendering Device then selects in one embodiment the BRIR pairs for the azimuth or elevation locations desired and applies those to the input audio signal to provide to headphones 735 spatialized audio. In other embodiments the selected BRIR datasets are stored in a separate module coupled to the audio rendering device 730 and/or headphones 735. In other embodiments, where only limited storage is available in the rendering device, the rendering device stores only the identification of the associated property data that best match the listener or the identification of the best match BRIR Dataset and downloads the desired BRIR pair (for a selected azimuth and elevation) in real time from the remote sever 710 as needed. As discussed earlier, these BRIR pairs are preferably derived by measurement with in car microphones on a population of moderate size (i.e., greater than 100 individuals) and stored along with similar image related properties associated with each BRIR data set. Where measurements are taken every 3 degrees in azimuth on the horizontal plane, and further extended to include corresponding elevation points at 3 degrees for the upper hemisphere, approximately 7200 measurement points would be required. Rather than taking all 7200 points, these can be generated in part by direct measurement and in part by interpolation to form a spherical grid of BRIR pairs. Even with the partially measured/partially interpolated grid, further points not falling on a grid line can be interpolated once the appropriate azimuth and elevation values are used to identify an appropriate BRIR pair for a point from the BRIR dataset.

Various embodiments of the present invention have been described above, typically with at least some of the BRIR parameters modified including room aspects such as room size, wall materials, and so on. It should be noted that the invention is not limited to modification parameters involving indoor room parameters. The scope of the invention is intended to further cover an environment where the "room" will be seen as an outdoor environment, such as a common space between city buildings, an outdoor amphitheater, or even an open field.

What is claimed is:

1. A method for generating modified Binaural Room Impulse Reponses (BRIRs) comprising:

generating a first Binaural Room Impulse Response (BRIR) based on a matching operation applied to extracted biometric properties;

segmenting the first BRIR into at least two regions by determining at least two regions of four regions that include a direct region, an early reflections region, a head and torso influenced region, and a late reverberation region for the first BRIR;

applying deconvolution to the direct region of the first BRIR to remove first loudspeaker effects from the direct region and create a deconvolved direct region of the first BRIR, wherein the first loudspeaker effects comprise a measured loudspeaker impulse response of a first loudspeaker;

convolving an impulse response for a target loudspeaker with the deconvolved direct region of the first BRIR to at least partially generate at least one modified region, wherein the at least one modified region includes the deconvolved direct region of the first BRIR corresponding to different loudspeaker acoustic properties from the first loudspeaker, wherein the at least one modified region is further at least partially generated by a modification operation comprising adapting different perceived loudspeaker acoustic properties from the first BRIR; and combining the at least one modified region and any unmodified regions of the first BRIR to form a modified BRIR, wherein the at least one modified region corresponds to a removal of head-related transfer function (HRTF) effects on a listener relating to a second BRIR to obtain a result of the removal of the HRTF effects on the listener and substituting the result of the removal of the HRTF effects on the listener into the first BRIR.

2. The method as recited in claim 1, wherein the generating the at least one modified region includes at least one of truncation, altering the slope of the decay rate, windowing, smoothing, ramping, and full room swapping.

3. The method as recited in claim 1, wherein the modified BRIR is intended to mimic an audio processing performed by the target loudspeaker different from the first loudspeaker used for the second BRIR and the at least one modified region is generated from a corresponding region culled from an impulse response for the target loudspeaker; and convolving the impulse response for the second loudspeaker with the deconvolved direct region of the first BRIR.

4. The method recited in claim 1, wherein the modified BRIR is intended to mimic an audio processing performed by a target room different from a first room used for the first BRIR and the at least one modified region is generated from a corresponding region derived from an impulse response for the target room, and wherein the segmenting includes determining at least one of the early reflections region and the late reverberation region of the first BRIR, and further comprising applying changes to at least one of the early reflections region and the late reverberations region to reflect sound characteristics of the target room.

5. The method as recited in claim 4, wherein the first loudspeaker effects are deconvolved from the first BRIR and further comprising convolving the impulse response for the target loudspeaker with the deconvolved direct region of the first BRIR for the first loudspeaker.

6. The method as recited in claim 1, wherein the first BRIR is a BRIR for an individual generated by accessing a database comprising a candidate pool of BRIRs for a population of individuals, each of the BRIRs in the candidate pool indexed according to the extracted biometric properties.

7. A system for modifying room or speaker characteristics for spatial audio rendering over headphones including a processor performing the steps of:

- generating a first BRIR based on a matching operation applied to extracted biometric properties;
- receiving the first BRIR corresponding to a first loudspeaker in a first room;
- segmenting the first BRIR into at least two regions by determining at least two regions of four regions that include a direct region, an early reflections region, a head and torso influenced region, and a late reverberation region for the first BRIR;
- applying deconvolution to the direct region of the first BRIR to remove first loudspeaker effects from the direct region and create a deconvolved direct region of the first BRIR, wherein the first loudspeaker effects comprise a measured loudspeaker impulse response of a first loudspeaker;
- convolving a target loudspeaker response with the deconvolved direct region of the first BRIR to at least partially generate at least one modified region, wherein the at least one modified region includes the deconvolved direct region of the first BRIR corresponding to different loudspeaker acoustic properties from the first loudspeaker, wherein the at least one modified region is further at least partially generated by a modification operation comprising adapting different perceived loudspeaker acoustic properties from the first BRIR; and
- combining the at least one modified region and the unmodified regions of the first BRIR to form a modified BRIR, wherein the at least one modified region corresponds to changed sound attributes for a loudspeaker-room-listener interrelationship.

8. The system as recited in claim 7, wherein the modified BRIR is intended to mimic changes in the sound attributes for a loudspeaker-room-listener interrelationship that are derived from at least one of changes in loudspeaker composition, loudspeaker distance to room walls, loudspeaker distance to listener, room size, room and of dimensions, room construction, or room furnishings.

9. The system as recited in claim 7, wherein the modified BRIR is synthesized to simulate non-room environments and further comprising:

- using the processor to segment the first BRIR into regions that include the direct region, the early reflections region, the head and torso influenced region, and the late reverberation region; and
- using ray tracing to synthesize the new reverberation to remove the late reverberation region and the early reflections region to create the non-room environment with no early reflection and late reverberation.

10. A method for generating modified spatial audio transfer functions comprising:

- generating a first spatial audio transfer function customized for an individual by accessing a spatial audio transfer function indexed according to extracted image based properties, wherein the generating is based on a matching operation applied to the extracted image based properties;
- segmenting the first spatial audio transfer function into at least two regions by determining at least two regions of four regions that include a direct region, an early reflections region, a head and torso influenced region, and a late reverberation region for the first spatial audio transfer function; and
- performing a modification operation on at least one of the at least two regions to at least partially generate at least one modified region, wherein the modification operation comprises adapting different perceived loudspeaker acoustic properties or room acoustic properties from the first spatial audio transfer function and performing deconvolution to the direct region of the first spatial audio transfer function to remove first loudspeaker effects from the direct region and create a deconvolved direct region of the first spatial audio transfer function, wherein the first loudspeaker effects comprise a measured loudspeaker impulse response of a first loudspeaker;
- convolving a target loudspeaker response with the deconvolved direct region of the first spatial audio transfer function, wherein the at least one modified region is further at least partially generated by a modification operation comprising adapting different perceived loudspeaker acoustic properties from the first loudspeaker from the first spatial audio transfer function; and
- combining the at least one modified region and any unmodified regions of the first spatial audio transfer function of the at least two regions to form a modified spatial audio transfer function that provides virtualization of the target loudspeaker having different acoustic properties than the loudspeaker used as a basis for the first spatial audio transfer function.

* * * * *